Patented Mar. 28, 1950

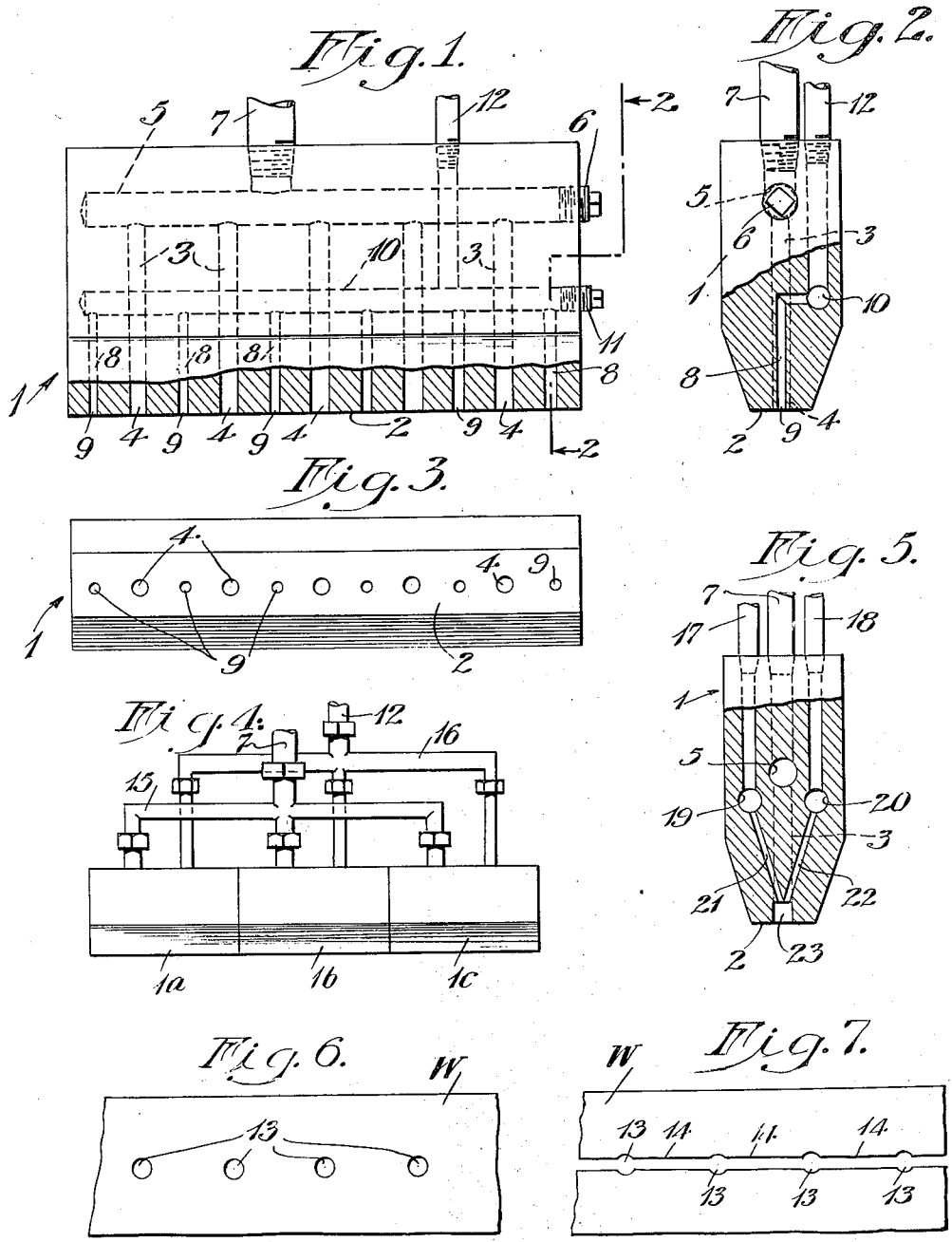

2,501,724

UNITED STATES PATENT OFFICE 2,501,724

APPARATUS FOR THERMOCHEMICALLY CUTTING METAL

Howard G. Hughey, Fanwood, N. J., assignor to Air Reduction Company, Incorporated, a corporation of New York Application February 15, 1946, Serial No. 647,681

2 Claims. (Cl. 158—27.4)

This invention relates to apparatus for thermochemically cutting metal plates, strips, and the like.

In some metal cutting operations it is desirable to effect rapid severing of the work-piece, the quality of the cut not being an important factor.

The principal object of the invention is to provide apparatus by which metal work-pieces can be thermo-chemically severed in a very short period of time.

According to the invention the apparatus comprises a torch tip adapted to preheat the work-piece along the length of the proposed cut and then to project a row of spaced cutting oxygen jets against the work to pierce it simultaneously at a number of points spaced along the line of the proposed cut. Then by relatively moving the torch tip and the work lengthwise of the row of cutting oxygen jets and in the direction of the proposed cut the metal can be cut between the holes pierced by the cutting jets to thereby completely sever the work-piece. The amount of movement of the torch tip required to produce a final long cut in the work-piece is therefore only the distance that the pierced holes are spaced apart. The torch tip cannot be used in this way to produce a very smooth cut but it is useful in operations requiring fast cutting but not requiring very high quality cuts. For instance, it is useful for cutting strip ends in apparatus that operates continuously and in which the strip ends have to be cut off straight and the end of one strip welded to the end of the next strip within a very short period of time.

Several forms of torch tips embodying the invention are illustrated in the accompanying drawings, in which:

Figure 1 is a side elevation, partly in section, of one form of torch tip embodying the invention;

Fig. 2 is a transverse vertical section taken on the line 2—2 of Fig. 1;

Fig. 3 is a plan view of the discharge face of the torch tip shown in Figs. 1 and 2;

Fig. 4 is a side elevation of a composite tip made up to any desired length by placing in end-to-end relation a number of individual tips;

Fig. 5 is a transverse vertical section of a modified form of torch tip embodying the invention, and Figs. 6 and 7 are plan views of a portion of a metal plate or strip illustrating how it may be cut by the use of a torch tip embodying the invention.

Referring first to Figs. 1 to 3 inclusive, the torch tip therein illustrated comprises an elongated block 1 of metal. The lower face 2 of the block constitutes the discharge face of the tip. The block 1 has a row of jet passages 3 (Fig. 1) terminating in a row of discharge orifices 4 in the discharge face of the tip (Fig. 3). The jet passages 3 all communicate with a gas distributing chamber 5 which may comprise a bore drilled longitudinally into the block from one of its ends and then plugged at its open end as shown at 6. Cutting oxygen is delivered to the distributing chamber 5 by means of an inlet pipe 7. The discharge orifices 4 are evenly spaced along the length of the discharge face of the tip as shown in Fig. 3. The jet passages 3 and their discharge orifices 4 are adapted to direct jets of the cutting oxygen against the work surface substantially at right angles to the surface so that when the metal is at kindling temperature the oxygen jets will pierce holes simultaneously in the work at a number of points spaced along the line of the proposed cut. The discharge orifices 4 are spaced apart a distance equal to the desired spacing between the holes to be pierced in the work by the cutting jets.

To preheat the metal to kindling temperature the tip is provided with a row of preheat jet passages 8 (Fig. 1) terminating in discharge orifices 9 in the discharge face of the tip (Fig. 3). The discharge orifices 9 of the preheat passages alternate with the cutting oxygen discharge orifices 4 as clearly shown in Fig. 3. The preheat jet passages 8 all communicate with a gas distributing chamber 10 which may comprise a second bore drilled longitudinally into the block from one of its ends and plugged at its open end as shown at 11. A combustible mixture of oxygen and a fuel gas such as acetylene is delivered to the distributing chamber 10 by an inlet pipe 12.

In cutting metal by the use of a torch tip of the kind above described the metal is first heated to kindling temperature along the line of the proposed cut by turning on the supply of combustible gas mixture and igniting the jets of the gas mixture issuing from the discharge orifices 9 to produce preheating flames which impinge on the work surface along the line of the proposed cut. As soon as the metal is heated to kindling temperature the supply of cutting oxygen is turned on and jets of the cutting oxygen issue from the discharge orifices 4 and pierce a number of evenly spaced holes 13 in the work W as shown in Fig. 6. The torch tip and the work are then relatively moved lengthwise of the row of cutting jets and in the direction of the proposed cut to simultaneously cut the bridges between the pierced holes as shown at 14 in Fig. 7.

The length of the cut that can be made in the work by one series of the above described steps depends on the length of the torch tip. If it is desired to completely sever the end of a plate or strip by cutting it across its entire width, the torch tip may of course be longer than the work-piece is wide, but it should at least have a length such that when one of the pierced holes is at one edge of the work-piece the last pierced hole of the row will lie not farther from the other edge of the work-piece than the distance between the cutting jets. Thus, after the holes are pierced in the work, the work-piece can be completely severed merely by moving the torch tip lengthwise of the row of cutting jets a distance equal to the distance between the holes pierced in the work. A relatively long cut can therefore be made in the work-piece in a relatively short time since very little time is required for bringing the metal to kindling temperature and for piercing the holes simultaneously in the work and very little additional time is required for simultaneously cutting the bridges by the relatively small movement of the torch tip that is required for this purpose.

The width of the plate or strip that can be cut by the method above described is of course governed by the practical tip length. To produce relatively long cuts, or to completely sever relatively wide work-pieces, a series of torch tips of the kind above described may be assembled in end-to-end relation as shown at 1a, 1b and 1c in Fig. 4. The cutting oxygen may be supplied to all of the tips from the inlet pipe 7 through a manifold 15, and similarly the combustible gas mixture for the preheating flames may be supplied to all the torch tips from the inlet pipe 12 through a manifold 16. By employing a composite tip of the kind shown in Fig. 4 having the necessary number of tip units assembled in end-to-end relation it is possible to make a very long continuous cut in a work-piece, after the holes are pierced in it, merely by moving the tip assembly endwise a distance equal to the spacing between the cutting jets to thereby cut the metal which bridges the pierced holes.

A modified form of torch tip embodying the invention is illustrated in Fig. 5. In this type of torch tip the heating oxygen and fuel gas, instead of being pre-mixed, are delivered through separate pipes 17 and 18. The heating oxygen is supplied to one distributing chamber 19, similar to the distributing chamber shown at 10 in Fig. 1, and the fuel gas is supplied to a separate and similar distributing chamber 20. Jet passages 21 leading from the distributing chamber 19 converge with respect to jet passages 22 leading from the distributing chamber 20 and meet either substantially flush with the discharge face of the tip so that the heating oxygen and fuel gas are mixed externally of the tip, or at the bottom of a recess 23 extending longitudinally along the discharge face of the torch tip, the tip in the latter case being of the semi-external mixing type. This type of tip is well adapted to withstand the effect of slag blown back upon the tip.

I claim:

1. Apparatus for thermo-chemically cutting metal work-pieces comprising a torch tip having a discharge face which is elongated in the direction of the length of the cut to be made in the work-piece, means for projecting from the discharge face of the tip a row of spaced cutting oxygen jets directed substantially at right angles to the work surface and whose axes lie substantially in a single plane, and additional means for projecting preheat gases from the tip to form streams of a combustible gas mixture which alternate with the cutting oxygen jets and whose axes lie in the same plane as the axes of the cutting oxygen jets.

2. Apparatus for thermo-chemically cutting metal work-pieces comprising a torch tip which is elongated in the direction of the length of the cut to be made in the work-piece, said tip having a row of cutting oxygen jet passages terminating in a row of discharge orifices in the discharge face of the tip, means for delivering cutting oxygen to said jet passages, said jet passages and their discharge orifices being arranged to project the cutting oxygen in a row of jets directed substantially at right angles to the work surface and whose axes lie substantially in a single plane, the torch tip also having preheat jet passages terminating in discharge orifices in the discharge face of the tip, and means for delivering a combustible gas mixture to said preheat passages, said preheat passages and their discharge orifices being arranged to project streams of the combustible gas mixture from the tip which alternate with the cutting oxygen jets and whose axes lie in the same plane as the axes of the cutting oxygen jets.

HOWARD G. HUGHEY.

REFERENCES CITED

The following references are of record in the file of this patent:

UNITED STATES PATENTS

| Number | Name | Date |
|---|---|---|
| 1,352,381 | Reynolds | Sept. 7, 1920 |
| 1,879,346 | Lawrence | Sept. 27, 1932 |
| 2,221,788 | Doyle | Nov. 19, 1940 |
| 2,277,472 | Anderson | Mar. 24, 1942 |
| 2,398,884 | Crowe | Apr. 23, 1946 |
| 2,417,412 | Herbst | Mar. 18, 1947 |
| 2,418,533 | Walker | Apr. 8, 1947 |

FOREIGN PATENTS

| Number | Country | Date |
|---|---|---|
| 694,191 | Germany | July 26, 1940 |

OTHER REFERENCES

The Welding Encyclopedia, 10th edition, 1941, published by Welding Engineering Pub. Co., Chicago, Ill. (Copy in Div. 3.) (Page 169.)